US012602534B2

(12) United States Patent
Thomsen et al.

(10) Patent No.: US 12,602,534 B2
(45) Date of Patent: Apr. 14, 2026

(54) METHOD AND SYSTEM TO DISPLAY CONTENT FROM A PDF DOCUMENT ON A SMALL SCREEN

(71) Applicant: Issuu, Inc., Palo Alto, CA (US)

(72) Inventors: Søren D. Thomsen, København Ø (DK); Anders H. Madsen, Copenhagen N. (DK); Søren Vind, Copenhagen N. (DK); Mads Sejersen, Frederiksberg (DK); Peter Assentorp, Københaven S. (DK)

(73) Assignee: Issuu, Inc., Palo Alto, CA (US)

( * ) Notice: Subject to any disclaimer, the term of this patent is extended or adjusted under 35 U.S.C. 154(b) by 63 days.

(21) Appl. No.: 15/415,693

(22) Filed: Jan. 25, 2017

(65) Prior Publication Data

US 2017/0212870 A1      Jul. 27, 2017

Related U.S. Application Data

(60) Provisional application No. 62/287,130, filed on Jan. 26, 2016.

(51) Int. Cl.
| | |
|---|---|
| *G06F 17/00* | (2019.01) |
| *G06F 3/0483* | (2013.01) |
| *G06F 40/106* | (2020.01) |

(52) U.S. Cl.
CPC .......... G06F 40/106 (2020.01); G06F 3/0483 (2013.01); *G06F 2203/04806* (2013.01)

(58) Field of Classification Search
CPC .......... G06F 17/24; G06F 17/25; G06T 11/60; A63F 2300/5553; A63F 2300/6623

(Continued)

(56) References Cited

U.S. PATENT DOCUMENTS

| | | | |
|---|---|---|---|
| 5,892,843 | A | 4/1999 | Zhou et al. |
| 6,169,998 | B1 | 1/2001 | Iwasaki et al. |

(Continued)

FOREIGN PATENT DOCUMENTS

| | | | | |
|---|---|---|---|---|
| DE | 102012216165 A1 | * | 3/2013 | ............... G06F 3/14 |
| WO | WO-2010078475 A2 | * | 7/2010 | ............. G06F 16/93 |

OTHER PUBLICATIONS

PCT/US2017/040264—International Search Report and Written Opinion dated Mar. 29, 2018, 8 pages.

(Continued)

*Primary Examiner* — Andrew T McIntosh
(74) *Attorney, Agent, or Firm* — Haynes Beffel & Wolfeld LLP; Andrew L. Dunlap; Paul A. Durdok

(57) ABSTRACT

Roughly described, a viewer application is provided for viewing a PDF document on a screen of a device such as a mobile phone or tablet. The viewer application may operate in page mode or in text mode. In page mode the original layout is maintained, and navigation assistance is provided by use of a navigation pane indicating the contents of the screen with a superimposed frame. Display of the navigation pane is controllable by the user. In page mode a selected text column is scrolled and zoomed to optimize reading. In text mode, text is extracted from the document and reformatted in text view to be continuous and complete in correct reading order, and images and advertising may be excluded. The user may toggle between page mode and text mode. The viewer application is implemented in software to by executed by a processor on the device.

38 Claims, 6 Drawing Sheets

(58) Field of Classification Search
USPC ................................. 715/201, 202, 230, 255
See application file for complete search history.

(56)                   References Cited

U.S. PATENT DOCUMENTS

| | | | |
|---|---|---|---|
| 6,219,679 B1 | 4/2001 | Brisebois et al. | |
| 6,976,210 B1 | 12/2005 | Silva et al. | |
| 7,130,861 B2 | 10/2006 | Bookman et al. | |
| 7,519,573 B2 | 4/2009 | Helfman et al. | |
| 7,912,705 B2 | 3/2011 | Wasson et al. | |
| 7,962,846 B2 | 6/2011 | Lerner et al. | |
| 8,255,820 B2 | 8/2012 | Rivlin et al. | |
| 8,332,424 B2 | 12/2012 | Flynn et al. | |
| 8,558,808 B2 | 10/2013 | Forstall et al. | |
| 8,582,801 B2 | 11/2013 | Goto et al. | |
| 8,799,273 B1 | 8/2014 | Chang et al. | |
| 9,213,684 B2 * | 12/2015 | Lai ........................ | G06F 40/151 |
| 2005/0021754 A1 * | 1/2005 | Alda ..................... | G06F 9/4488 |
| | | | 709/225 |
| 2005/0055632 A1 * | 3/2005 | Schwartz ............. | G06F 40/103 |
| | | | 715/201 |
| 2007/0044013 A1 | 2/2007 | Hyatt | |
| 2007/0217701 A1 * | 9/2007 | Liu ......................... | G06K 9/38 |
| | | | 382/234 |
| 2008/0077847 A1 | 3/2008 | Dejean | |
| 2008/0162356 A1 | 7/2008 | Parket et al. | |
| 2008/0201452 A1 | 8/2008 | Athas et al. | |
| 2008/0294981 A1 | 11/2008 | Balzano et al. | |
| 2008/0307297 A1 | 12/2008 | Ohlenbusch et al. | |
| 2009/0172517 A1 | 7/2009 | Kalicharan | |
| 2009/0187535 A1 * | 7/2009 | Warnock ............. | G06V 30/416 |
| | | | 707/999.009 |
| 2010/0005387 A1 * | 1/2010 | Toki ...................... | G06F 3/0481 |
| | | | 715/788 |
| 2011/0099071 A1 | 4/2011 | Johnson | |
| 2011/0117971 A1 * | 5/2011 | Kim ...................... | G06F 1/1647 |
| | | | 455/566 |
| 2011/0125512 A1 | 5/2011 | Huang | |
| 2011/0184960 A1 | 7/2011 | Delpha et al. | |
| 2012/0005567 A1 | 1/2012 | Burckart et al. | |
| 2012/0030553 A1 | 2/2012 | Delpha et al. | |
| 2012/0137200 A1 * | 5/2012 | Shar .................... | G06F 16/3323 |
| | | | 715/202 |
| 2012/0144292 A1 | 6/2012 | Lee | |
| 2012/0151383 A1 | 6/2012 | Kazan et al. | |
| 2012/0311509 A1 | 12/2012 | Maggiotto et al. | |
| 2013/0014007 A1 | 1/2013 | Kopp et al. | |
| 2013/0042200 A1 | 2/2013 | Armitage | |
| 2013/0054613 A1 | 2/2013 | Bishop | |
| 2013/0247221 A1 | 9/2013 | Victor | |
| 2013/0259377 A1 * | 10/2013 | Goktekin ............. | G06V 30/414 |
| | | | 382/176 |
| 2014/0006982 A1 | 1/2014 | Wabyick et al. | |
| 2014/0250371 A1 | 9/2014 | Wabyick et al. | |
| 2014/0250372 A1 | 9/2014 | Slembrouck | |
| 2014/0282069 A1 | 9/2014 | Canetti et al. | |
| 2015/0007104 A1 | 1/2015 | Zhu | |
| 2015/0220490 A1 * | 8/2015 | Barber .................. | G06F 40/143 |
| | | | 715/234 |
| 2015/0254213 A1 | 9/2015 | McGushion et al. | |
| 2016/0147713 A1 | 5/2016 | Ni et al. | |
| 2016/0357717 A1 | 12/2016 | Metz et al. | |
| 2017/0147544 A1 | 5/2017 | Modani et al. | |
| 2018/0129634 A1 | 5/2018 | Sivaji et al. | |
| 2018/0196804 A1 | 7/2018 | Mani et al. | |
| 2018/0276296 A1 | 9/2018 | Gerlach | |

OTHER PUBLICATIONS

Adobe.com, Adobe Acrobat 5.0, Reflow the contents of Adobe PDF, Mar. 2012, 2 pages (retreived from hhttps://web.archive.org/web/20120312080826/http://www.adobe.com/uk/epaper/tips/acr5reflow/pdfs/acr5reflow.pdf).

Adobe.com, Liquid layouts and Alternate layouts, CC, CS6, Mar. 16, 2017, 11 pages (retreived from https://helpx.adobe.com/indesign/using/alternate-layouts-liquid-layouts.html).

Rodriguez et al., "The convergence of digital libraries and the peer-review process." Journal of Information Science 32.2 (2006), 12 pages.

Phelps et al., "Multivalent documents: Inducing structure and behaviors in online digital documents." In System Sciences, 1996., Proceedings of the Twenty-Ninth Hawaii International Conference on,, vol. 5, pp. 144-152. IEEE, 1996.

Jäschke et al., "Organizing Publications and Bookmarks in BibSonomy." In CKC. 2007, 4 pages.

Dudchuk et al., "Ontos clip and share," Proceedings of the 6th International Conference on Semantic Systems. ACM, 2010, 2 pages.

U.S. Appl. No. 14/657,831—Office Action dated Jan. 26, 2017, 60 pages.

U.S. Appl. No. 14/657,831—Final Office Action dated Jun. 30, 2017, 57 pages.

Google, definition of the word "specify", retrieved on Jan. 24, 2018, available at <https://www.google.com/search?q-define%3A+specifying&rlz=1C1GGRV_enUS768US768&oq=define%3A+specifying&aqs=chrome..69i57j69i58.7733j0j7&sourcid=chrome&ie=UTF-8>, 1page.

U.S. Appl. No. 14/657,831—Final Office Action dated Feb. 8, 2018, 59 pages.

Walsh, "Facebook Open Graph META Tags," https://web.archive.org/web/20110429065857/https://davidwalsh.name/facebook-meta-tags, accesed May 4, 2018, 2 pages.

U.S. Appl. No. 16/572,525—Office Action dated Jan. 25, 2021, 14 pages.

U.S. Appl. No. 14/657,831—Notice of Allowance dated May 23, 2018, 28 pages.

U.S. Appl. No. 14/657,831—Response to Final Office Action dated Feb. 8, 2018, filed Apr. 12, 2018, 15 pages.

U.S. Appl. No. 14/657,831—Response to Final Office Action dated Jun. 30, 2017, filed Dec. 21, 2017, 21 pages.

U.S. Appl. No. 14/657,831—Response to Final Office Action dated Jun. 30, 2017, filed Oct. 25, 2017, 24 pages.

U.S. Appl. No. 14/657,831—Response to Office Action dated Jan. 26, 2017, filed May 19, 2019, 24 pages.

U.S. Appl. No. 16/572,525—Response to Office Action dated Jan. 25, 2021, filed Apr. 26, 2021, 15 pages.

U.S. Appl. No. 16/572,525—Notice of Allowance dated May 4, 2021, 28 pages.

U.S. Appl. No. 16/572,525—Notice of Allowance dated Sep. 14, 2021, 26 pages.

* cited by examiner

30

40

12

14

METHOD AND SYSTEM TO DISPLAY CONTENT FROM A PDF DOCUMENT ON A SMALL SCREEN

CROSS REFERENCE TO RELATED APPLICATION

This application claims priority under 35 U.S.C. § 119(e) to U.S. Provisional Application No. 62/287,130, entitled "METHOD AND SYSTEM TO DISPLAY CONTENT FROM A PDF DOCUMENT ON A SMALL SCREEN", filed on 26 Jan. 2016, by Søren D. Thomsen, Anders H. Madsen, Søren Vind, Mads Sejersen, Peter Assentorp, which application is incorporated herein by reference in its entirety.

BACKGROUND

With the rise of electronic publishing, more and more readers are viewing published documents, such as popular magazines, newspapers, trade and scientific journals and the like on electronic devices. These documents are generally made available to electronic publishers as portable device format (PDF) files and are formatted for print, rather than for electronic viewing. Navigation in an electronic document described in a PDF file can be cumbersome, particularly on an electronic device having a small screen, such as mobile phone or a small tablet.

SUMMARY

The technology disclosed herein relates to a system and method to view PDF documents on screens of smaller devices, such as mobile phones and small tablets, specifically when the size of the screen renders reading difficult or impossible when an entire page is displayed.

A viewer application for viewing content from a document defined in a PDF file on a small screen is described herein. The document has an original layout and comprises at least one content area and at least one content unit, wherein the viewer application executes the following steps: Analyzing the document to: (a) identify content areas of the document of the body text type, (b) correlate each body text type content area with a content unit, (c) identify a correct reading order for the body text type content areas of each content unit; displaying a current page of the document in its original layout; and in response to reader selection of a body text type content area of one of the at least one content units, providing navigation means allowing the user to read the content unit in correct reading order.

Analyzing the document may comprise analyzing the font size or case of the initial letters or word of the content area; or detecting and deciphering continuation guidance within a content area. For example, during the analyzing step, a content area is determined not to be of the body text type if it contains ten words or fewer, or if it is identical to a text entry in a table of contents.

A viewer application for viewing a document on a screen of a device, is described herein. In some embodiments, the document includes a current page, the current page having an original layout, wherein the viewer application may select between least two modes, the modes comprising: page mode, wherein the original layout of the current page is preserved; and text mode, wherein body text is extracted from the document and reformatted in a text view, wherein the document is described in a PDF file, and wherein the viewer application is implemented as software code portions. A user of the viewer application can toggle between page mode and text mode. The original layout may include multiple content areas, for example including at least two types of content areas from the group consisting of titles, subtitles, captions, body text, and images.

The device may be a mobile phone or a tablet. In some embodiments, in text mode, the body text is extracted from a content unit and is reformatted to be continuous and complete in correct reading order. The content unit may be a magazine article or newspaper article. In some embodiments, in text mode, no images are included in the text view. In some embodiments, in page mode, a navigation pane displays the current page with a superimposed frame indicating current contents of the screen, and the superimposed frame can be moved by a user to change the current contents of the screen.

In embodiments, the screen has a width and a top, and, in page mode, in response to a user tapping within an area of a first text column having a first line, a width of the first text column is zoomed to the width of the screen, and the first text column is positioned with its first line at the top of the screen. The first text column may include a first segment of a content unit, wherein a next icon appears at the bottom of the first text column, and wherein, in response to the user selecting the next icon, a second text column including a next segment of the content unit is displayed on the screen.

A viewer application for viewing a document on a screen of a device is described, wherein the document includes a current page, wherein the current page has an original layout comprising multiple content areas, wherein the multiple content areas include at least two types of content areas from the group consisting of titles, subtitles, captions, body text, pull quotes, images, and graphics, wherein, responsive to a text mode command from a user, body text is extracted from the document and reformatted to be continuous, complete and in correct reading order, and wherein the document is described in a PDF file. The body text may be extracted from a content unit, such as a magazine article or newspaper article. The text mode command from the user may be issued by a tap or double-tap on the screen. In some embodiments, the document may comprise one or more additional pages, each additional page having a respective original layout, and, responsive to a page mode command from the user, the viewer application may display at least a portion of the original layout of the current page or of an additional page. Correct reading order is determined by information in the PDF file, and may be determined based on rules. The rules may be compiled by a process of machine learning.

A viewer application for viewing a document on a screen of a device is described. The document includes a current page, wherein the current page has an original layout comprising multiple content areas, wherein the multiple content areas include at least two types of content areas from the group consisting of titles, subtitles, captions, body text, pull quotes, images, and graphics, wherein the current page is displayed in its original layout and a navigation pane displays the current page with a superimposed frame indicating current contents of the screen, and wherein the document is described in a PDF file. The device may be a mobile phone or a tablet. In some embodiments, the superimposed frame can be moved by a user to change the current contents of the screen, and a user can toggle display of the navigation pane off and on. In some embodiments, the screen has a width and a top and, in page mode, in response to a user tapping within an area of a first text column having a first line, the first text column is zoomed to the width of the screen and positioned with its first line at the top of the screen.

In some embodiments, the first text column includes a first segment of a content unit, wherein a next icon appears at the bottom of the first text column, and, in response to the user selecting the next icon, a second text column including a next segment of the content unit is displayed on the screen.

DETAILED DESCRIPTION

To standardize the appearance of printed documents across different devices and operating systems, PDF was developed in the 1990s, and has become the standard in print publishing.

For online publishing, documents such as magazines and newspapers are generally provided in PDF documents. Using its PDF definition, a document's online appearance can be the same as its print version, which is typically optimized for US letter format. On a screen of suitable size and resolution, a user can display an entire page or even two facing pages of a document, and can interact with the online version just as he or she would the print version. A screen is of suitable size and resolution for an electronic document if, when the page is displayed in its entirety on the screen, all text is comfortably readable to a user. Generally, for example, the screen of a conventional desktop computer is of suitable size and resolution to view a standard-size magazine page.

Figure 1A:
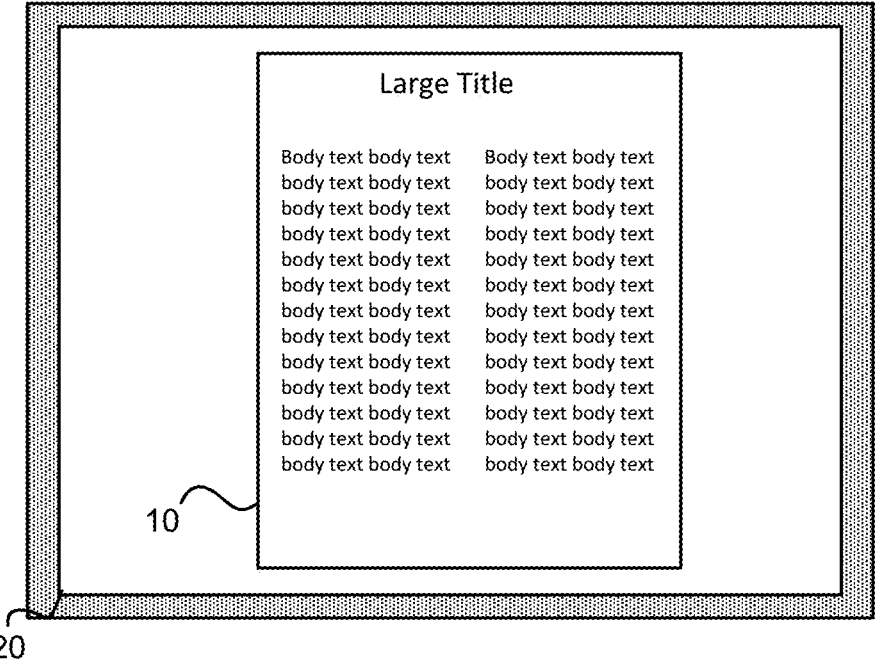
FIG. 1*a* illustrates a full page of a document displayed on a large screen.
Figure 1B:
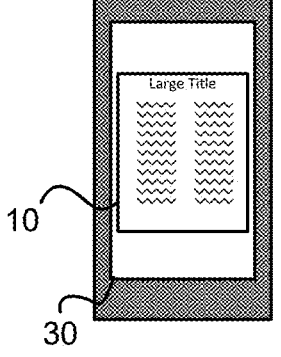
FIG. 1*b* illustrates the same full page displayed on a device having a small screen.

Difficulties arise, however, when viewing a document on a small screen, such as the screen of a mobile phone, small tablet, small laptop or palmtop computer. FIG. 1*a* shows a full page of document 10 displayed on a desktop screen 20. FIG. 1*b* shows a full page of the same document 10 displayed, in its original layout, on small screen 30. The body text of document 10 on small screen 30 is too small to be readable. Text is considered too small to be readable when a person having normal eyesight (without any visual aid) cannot readily discern text characters unaided when using the device in a typical manner while held at a typical reading distance from the eyes. For the purposes of this discussion a "small screen" is a screen too small for body text to be readable when an entire page of a document is displayed on the screen.

Figure 2A:
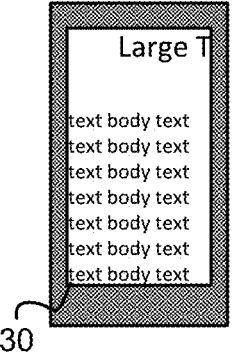
FIG. 2*a* illustrates the same page zoomed to readable size on a small screen.
Figure 2B:
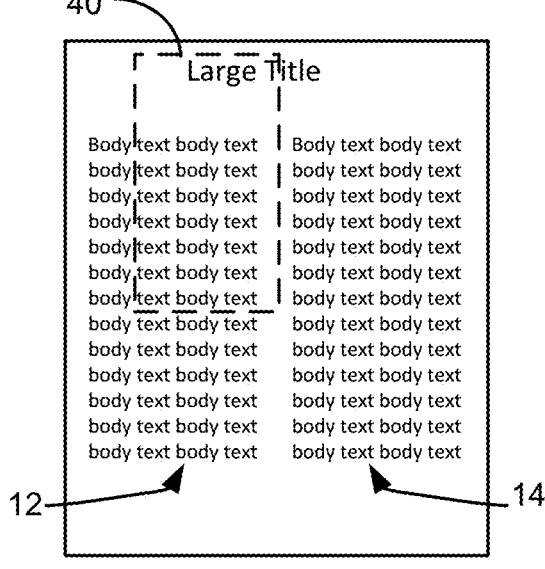
FIG. 2*b* shows the area of the full page displayed on the screen in FIG. 2*a*.

In order for the text of document 10 to be readable, document 10 may be zoomed so that only a portion of a page of document 10 is visible on small screen 30. FIG. 2*a* shows the appearance of small screen 30, and in FIG. 2*b*, frame 40 indicates the portion of document 10 shown in small screen 30. The user then becomes responsible for selecting a suitable level of zoom and for scrolling to the correct location to display text, in this case first text column 12. Once the user has finished reading the contents of text column 12, the user must scroll to find the following text, in this case at the top of text column 14. Such navigation can be cumbersome.

This example has described the difficulties that arise when viewing a document like a standard-size magazine on a small screen like a mobile phone. Similar difficulties could arise when viewing a very large document on a desktop or large tablet or laptop screen.

Aspects of the present invention provide tools to assist the user in navigating in a document when the document is viewed on a device having a screen too small to allow at least some text in a document to be read when an entire page is displayed on the screen. Aspects of the invention include a viewer, implemented in software configured to be run by a processor on the device.

Figure 3:
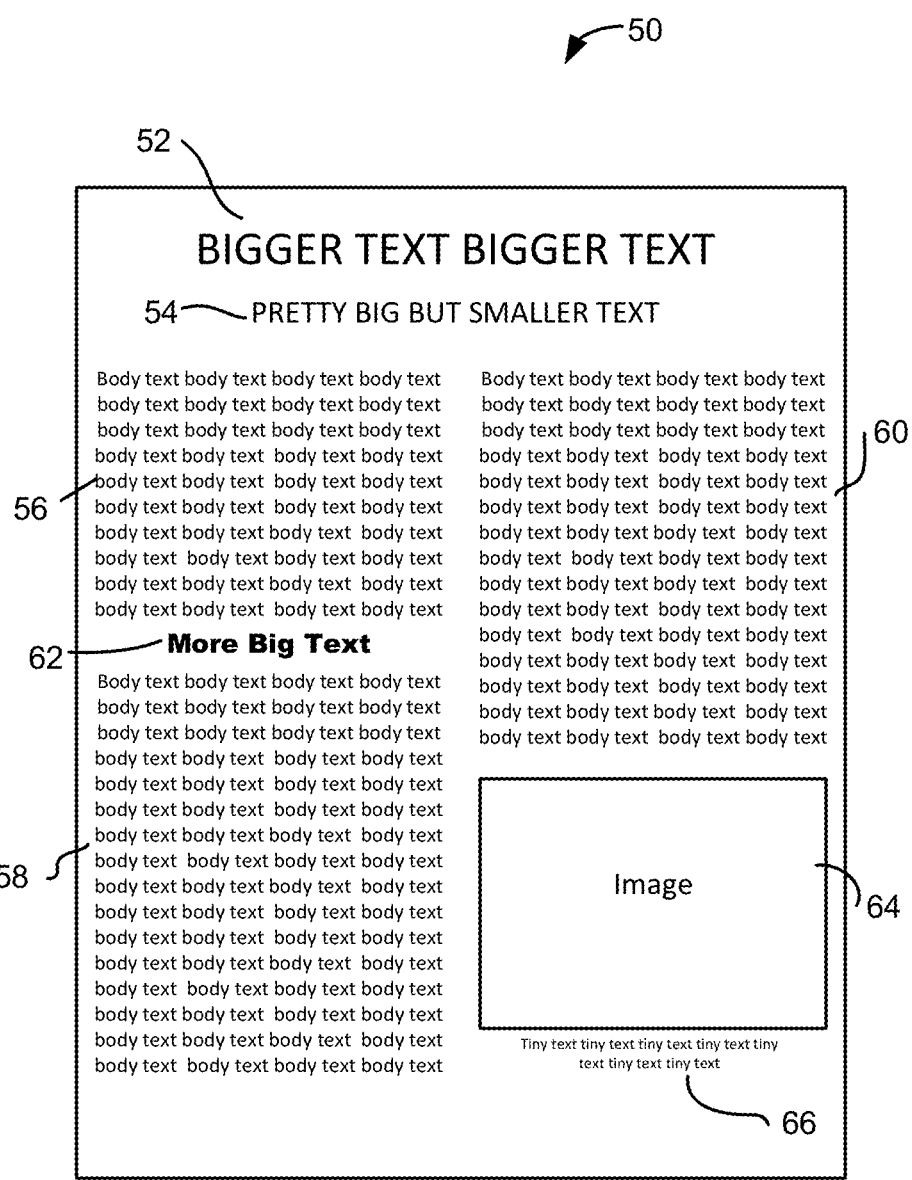
FIG. 3 shows an example PDF document.

Turning to FIG. 3, consider a document 50. Only a first page of document 50 is shown in FIG. 3, though there may be multiple pages. Document 50 is described in a PDF file. The PDF file provides the size and the location of multiple content areas, and the text or image associated with each. A content area is a contiguous area on a single page, generally rectangular, enclosing text or an image. Generally in a content area enclosing text, the text is all or nearly all of the same font, including style and size. The first page of document 50, displayed in FIG. 3, includes content areas 52, 54, 56, 58, 60, 62, 64, and 66. Standard PDF does not, however, identify what the content areas are, or their relationship to each other.

For example, it's likely that content area 52 is a title. Content area 54 may be a subtitle. Content areas 56, 58 and 60 may be related or independent body text. (This discussion will use the term "body text" to refer to the text making up the bulk of the content of an article, as opposed to the headline or caption.) Content area 62 may be a title for content area 58, or content areas 56 and 58 may be consecutive, and content area 62 may be a pull quote from that article. Content area 64 contains an image, suggesting that content area 66 may be a caption. A typical page will include two or more among the several types, including titles, subtitles, captions, pull-quotes, body text, and images.

The software viewer of the present invention performs analysis on the PDF that describes document 50 in order to determine the types of the content areas making up the pages of document 50, and how they relate to each other. This analysis will be discussed later.

The viewer of the present invention may operate in two modes, which will be called page mode and text mode. A displayed document may initially appear in page mode.

Figure 4A:
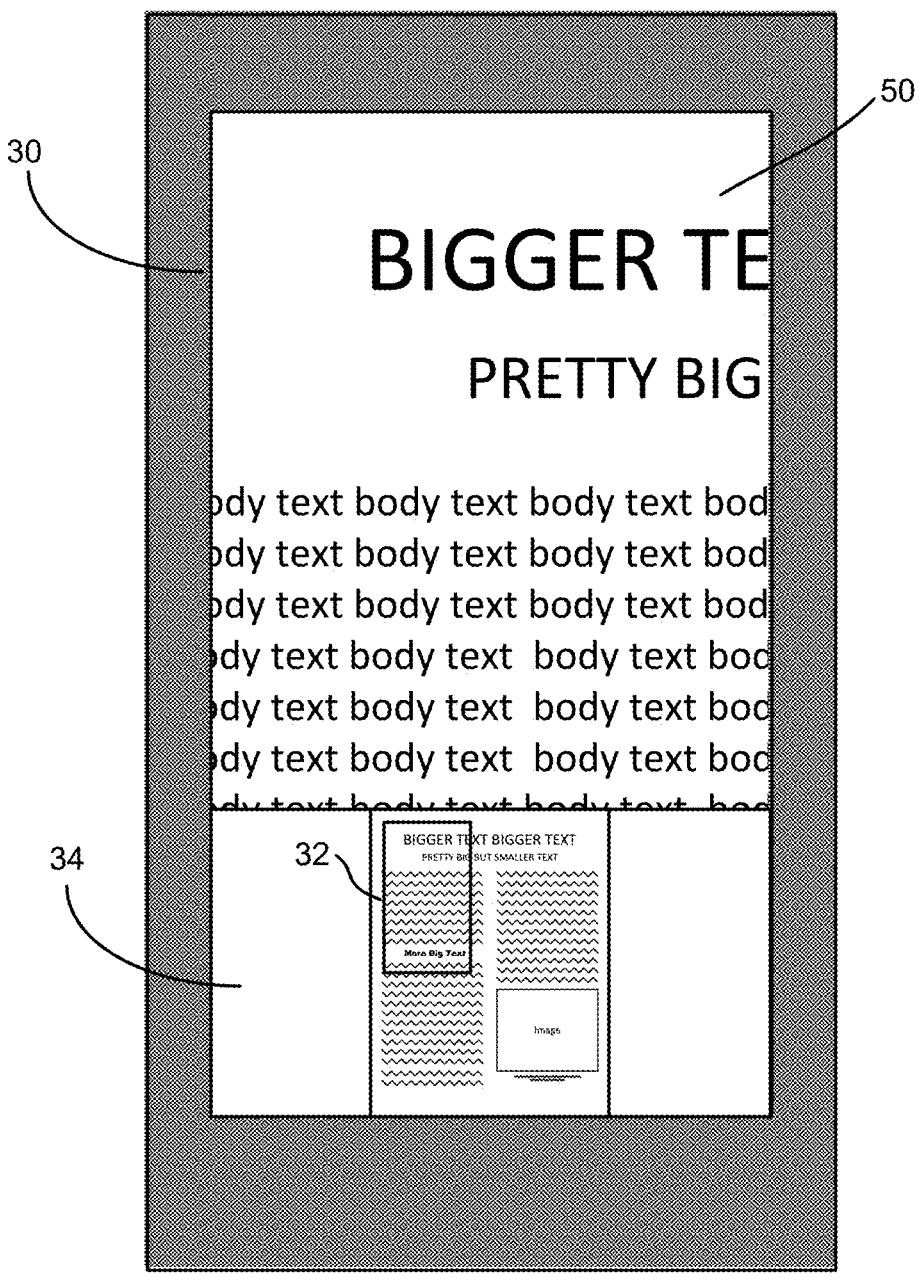
FIG. 4*a* shows the document of FIG. 3 displayed on a small screen in an embodiment of the present invention.

In page mode, the document retains its original layout, with tools provided to assist the user in navigating within that layout. Turning to FIG. 4*a*, on screen 30 in some embodiments a navigation pane 34 is displayed, for example at the bottom of the screen. The screen 30 may be at any zoom level, and thus may display only a portion of document 50. Navigation pane 34, however, shows the entire page, and includes a superimposed frame 32 indicating the location of screen 30 within the current page of document 50. In some embodiments the user may drag superimposed frame 32 to scroll within the current page of document 50.

Figure 4B:
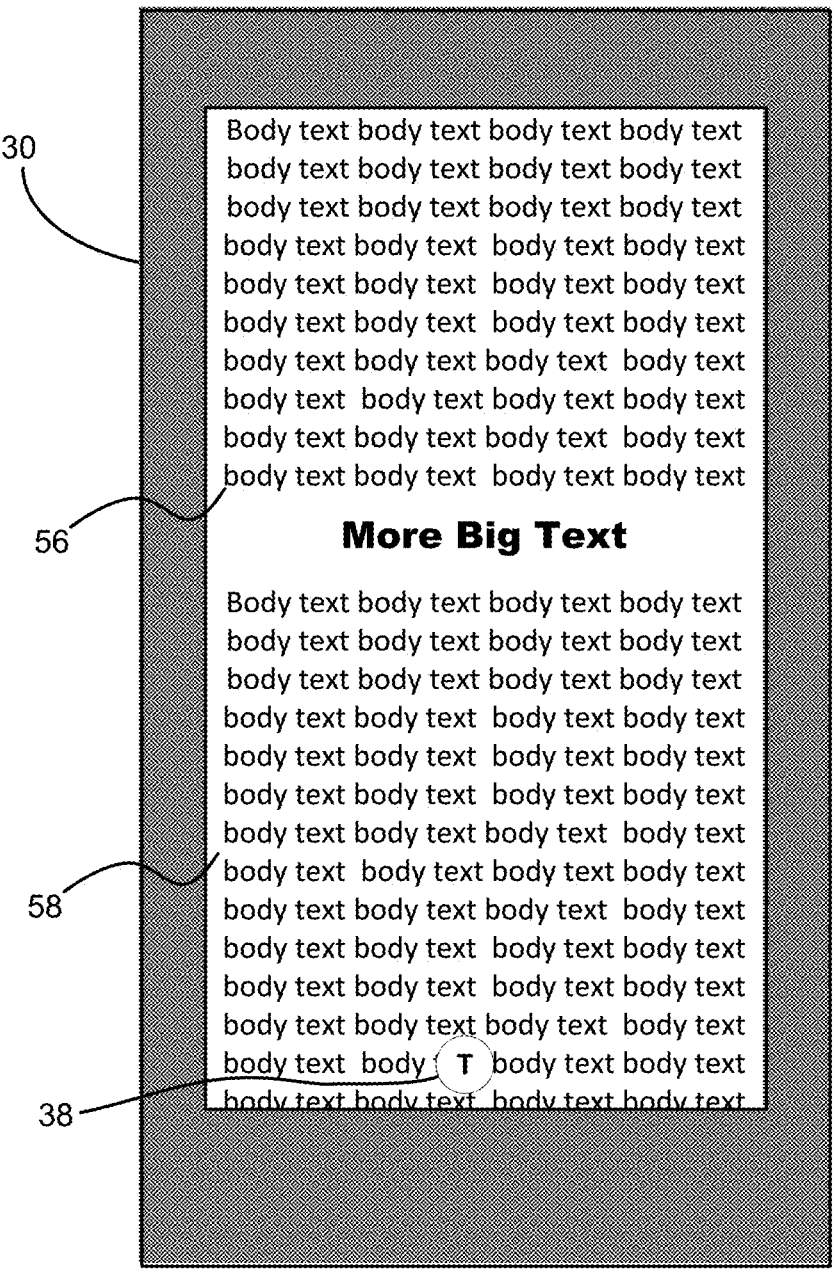
FIG. 4*b* shows the document of FIG. 3 displayed on a small screen, a text column zoomed and aligned to the screen according to an embodiment of the present invention.

After viewing the current page and reading headlines, a user may choose to read body text on the current page, for example starting with body text in content area 56 (shown in FIG. 3). The user may scroll so that any portion of content area 56 is displayed on screen 30, for example by dragging superimposed frame 32. The user then selects content area 56, for example by tapping or double-tapping anywhere within its area. Through analysis, the viewer has identified that content area 56 contains body text. A rectangular content area containing body text may be referred to as a text column. In response to selection of text column 56 by the user, for example by a tap or double-tap within its area, the current page of document 50 is zoomed and scrolled to optimize reading of text column 56. The page is scrolled so that the first line of text column 56 is at the top of screen 30, and a zoom level is selected so that the width of text column 56 is about the width of screen 30, as shown in FIG. 4*b*.

Navigation pane 34 may be automatically toggled off (as in FIG. 4*b*) when a text column is zoomed and scrolled for reading. In addition, a user may toggle navigation pane 34 off or on at any time.

If, in the original layout of the document, the width of a text column is so great that zooming it to fit the width of screen 30 renders text too small to be readable, in some embodiments, the viewer may automatically switch into text mode, described below.

Once the user has finished reading text column 56, he may continue reading the following text in the article, which, in this example, may be in content area 58. Content area 58 is also a text column. The user may select text column 58, for example by tapping it. In response, the page is scrolled so that the first line of text column 58 is at the top of screen 30, and a zoom level is selected so that the width of text column 58 is about the width of screen 30.

A next icon (not shown) may be displayed at the bottom of text column 58. Referring to FIG. 3, suppose the article continues in text column 60. To continue reading in text column 60, the reader may select the next icon. The page is scrolled so that the first line of text column 60 is at the top of screen 30, and a zoom level selected so that the width of text column 60 is about the width of screen 30. The user may continue to read the rest of the article in this manner, continuing on subsequent pages, to the end of the article. In short, when a content unit is broken into segments, selecting the next icon will move the reader from the current segment to the next segment in correct reading order. In some embodiments, a previous icon (not shown) allows the user to move backward, in correct reading order, through segments of the content unit.

When viewing a text column, the user will also have the option of selecting a text icon 38. Selecting text icon 38 toggles from page mode to text mode.

When the user selects text mode, the original layout is replaced with a text view. The body text is extracted from the content unit being read, and is reformatted in the text view to be continuous and complete in correct reading order. The term "content unit" is used herein to refer to text readable by the user. A content unit may be, for example, a newspaper article, a magazine article, a scholarly article, a textbook article or chapter, etc.

In text view, the text is optimized for reading. Graphics and images, such as illustrations or advertising, may be excluded from the text view. A font is selected to be readily readable on screen 30. The font may be the same as that used in article 30, or may be different. In some embodiments, the user is able to read the entire content unit by scrolling to the end with no additional navigation required. Alternatively, the content unit may be broken into two or more consecutive pages. The user may toggle from text mode back to page mode after reading the content unit, or at any time.

As noted earlier, in order to extract all of the body text of a content unit and display it in text view in correct reading order in text mode, or in order to advance from one text column to the next in page mode, analysis is performed of the PDF file to determine the type of the various content areas (for example areas 52-66 of document 50 in FIG. 3), and their relationship. Three approaches used to perform this analysis will be discussed. One, two, or all three approaches may be used, and when more than one is used, they may be used separately or together, in any order.

A first approach uses information from authoring tools. A PDF file can be created using authoring tools such as, for example, InDesign, from Adobe Systems. Using InDesign, a document designer can specify a text column on a page layout in which an article will start. If the text is too large to fit in the starting text column, it automatically flows into subsequent columns. When the document is exported to PDF, the authoring tool allows the user to include information about the links between these subsequent columns in the PDF file. If this information is present in the PDF, the viewer described in the present application uses this information to determine the correct reading order for a content unit.

A second approach uses a set of defined rules. A human reader, when faced with a page in a magazine, newspaper, textbook, etc., typically has no trouble understanding how to read it: Based on explicit and implicit guidance in the text and layout, and based on a reader's experience reading print documents, she can easily determine what headlines relate to what articles, where an article starts, continues, and finishes, when two text columns on a page are two consecutive columns of the same article, two articles, an article and a sidebar, an article and an advertisement, etc. For the human reader, this determination is largely intuitive.

For the viewer of the present invention, the process can be codified in a set of rules. For example, for western languages, the following rules might apply for text boxes:
If a text block starts with an oversize letter, it is assumed to be the start of an article.
If a text block starts with a lowercase letter it is assumed to be a continuation of an article.
If the content of a text block is identical to a text entry in a table of contents, it is assumed to be a headline.
If a text block contains fewer than ten words it is assumed to be a headline or a caption rather than body text.
The following rules might apply for interpreting page layout:
If a text box is below a detected headline, it is assumed to be the start of an article.
If a normal text block is below a detected text block and has no headline above it, it is assumed to be a continuation of the same article.
In addition, continuation guidance may be provided in the text. Continuation guidance may include words indicating continuation at the bottom of a text column, such as "See page 23" or "Please turn to pg. 5," and such guidance can be detected and deciphered. A sidebar often has a box around it, or uses a different font or a different color background. Reading order will be different depending on the language of the document, for example for English, Hebrew, Japanese, etc. The result of this approach is a list of articles containing headlines and the text belonging to each headline.

A third approach employs machine learning. The purpose is to model the layout of a PDF by capturing the structure and calculating a latent representation which can be used as a similarity measure between PDFs.

The steps include a training stage to build the model and a similarity stage used in production. The steps include:
Decompose the PDF into elements, such as text, images, location of text/image boxes, font sizes, font types etc.

Extract features from these elements, such as number of fonts per page, distance between text and image boxes, and so on.

Train a layout model, which learns from these features. This could be Deep Neural Network model, for instance.

The trained model can now produce a latent representation of a given PDF. In practice each representation is a list of real numbers, eg. [0.356, 0.01043, 0.023425 . . . ]

To evaluate the results from this automatic process, a large number of PDF documents, for example ten thousand documents (or more or fewer) may be marked manually. In each the beginning and ending of each content unit is identified, and headlines, subheads, pull quotes, captions, etc., are all identified and correctly associated with a content unit. Advertising, images, figures, etc. are identified as well. This manual marking is then compared to the automatic process, and the success of the automatic process can be awarded a score.

Figure 5:
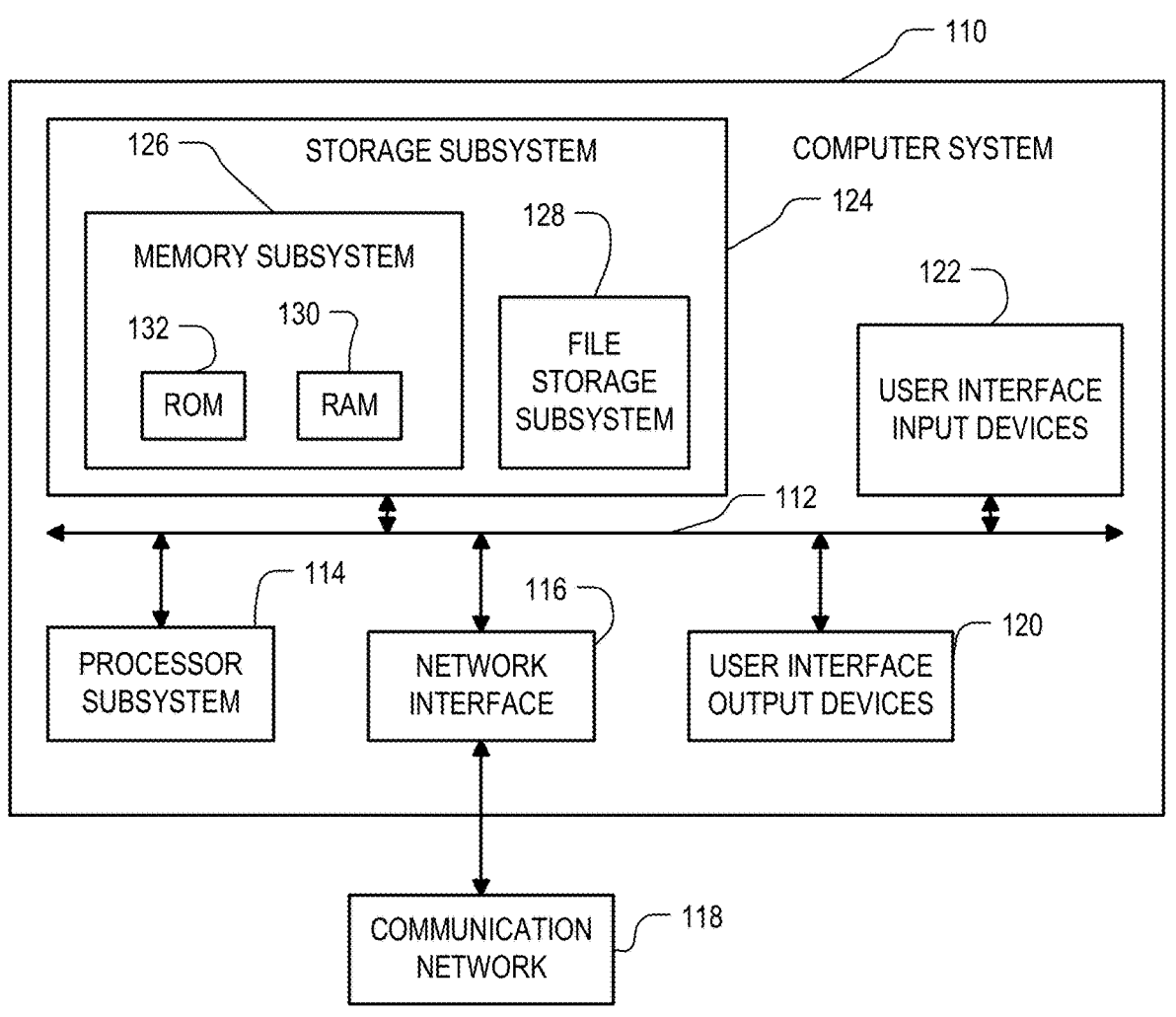
FIG. 5 is a simplified block diagram of a computer system 110 that can be used to implement software incorporating aspects of the present invention.

FIG. 5 is a simplified block diagram of a computer system 110 that can be used to implement software incorporating aspects of the present invention. While the foregoing description indicates that the viewer carries out specified operations, it will be appreciated in fact the viewer is implement as software code portions which cause computer system 110 to operate in the specified manner.

Computer system 110 typically includes a processor subsystem 114 which communicates with a number of peripheral devices via bus subsystem 112. These peripheral devices may include a storage subsystem 124, comprising a memory subsystem 126 and a file storage subsystem 128, user interface input devices 122, user interface output devices 120, and a network interface subsystem 116. The input and output devices allow user interaction with computer system 110. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, wireless links, or any other mechanisms for communication of information. While in one embodiment, communication network 118 is the Internet, in other embodiments, communication network 118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

As indicated earlier, when used to display a very large document, the viewer of the present application could operate on any computer, such as a standard desktop computer, but will more commonly be useful on devices having small screens, such as mobile phones, small tablets or laptops, palmtop computers, etc. User interface input devices 122 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 110 to the user or to another machine or computer system.

Storage subsystem 124 stores the basic programming and data constructs that provide the functionality of certain embodiments of the present invention. For example, the various modules implementing the functionality of certain embodiments of the invention may be stored in storage subsystem 124. These software modules are generally executed by processor subsystem 114.

Memory subsystem 126 typically includes a number of memories including a main random access memory (RAM) 130 for storage of instructions and data during program execution and a read only memory (ROM) 132 in which fixed instructions are stored. File storage subsystem 128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 128. The host memory 126 contains, among other things, computer instructions which, when executed by the processor subsystem 114, cause the computer system to operate or perform functions as described herein. As used herein, processes and software that are said to run in or on "the host" or "the computer", execute on the processor subsystem 114 in response to computer instructions and data in the host memory subsystem 126 including any other local or remote storage for such instructions and data.

Bus subsystem 112 provides a mechanism for letting the various components and subsystems of computer system 110 communicate with each other as intended. Although bus subsystem 112 is shown schematically as a single bus, alternative embodiments of the bus subsystem may use multiple busses.

Computer system 110 itself can be of varying types including a personal computer, a portable computer, a workstation, a computer terminal, a network computer, a television, a mainframe, a server farm, or any other data processing system or user device. Due to the ever-changing nature of computers and networks, the description of computer system 110 depicted in FIG. 5 is intended only as a specific example for purposes of illustrating the preferred embodiments of the present invention. Many other configurations of computer system 110 are possible having more or less components than the computer system depicted in FIG. 5.

In particular and without limitation, though many of the inventive aspects are described individually herein, it will be appreciated that many can be combined or used together with each other. All such combinations are intended to be included in the scope of this document.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

The invention claimed is:

1. A hand held device, comprising:
a processor;
a display screen; and
a memory, the memory having stored therein:
a PDF document including a current page, the current page having an original layout which includes text,
viewer application software code portions which, when executed by the processor, display at least a portion of the PDF document on the display screen, in
a page mode, wherein the original layout of the current page of the PDF document is preserved; and
viewer application software code portions which, when executed by the processor, perform: (i) obtaining a selection of a portion of the PDF document to display in a text mode, (ii) extracting the text of the selected portion of the PDF document from the PDF document and (iii) reformatting extracted text of the selected portion of the PDF document with word wrapping to fit a hand held device screen format in a text view.

2. The device of claim 1, further including viewer application software code portions which, when executed by the processor, toggle between displaying the at least a portion of the PDF document in page mode and displaying the selected portion of the PDF document in text mode responsive to a user input.

3. The device of claim 1, wherein the original layout includes multiple content areas.

4. The device of claim 3, wherein the multiple content areas include at least two types of content areas from the group consisting of titles, subtitles, captions, body text, and images.

5. The device of claim 1, wherein the device is a mobile phone or a tablet.

6. The device of claim 1, wherein the PDF document is a magazine article or newspaper article.

7. The device of claim 1, wherein, in page mode, a navigation pane displays the current page with a superimposed frame indicating current contents of the screen.

8. The device of claim 7, wherein the superimposed frame can be moved by a user to change the current contents of the screen.

9. The device of claim 7, further including viewer application software code portions which, when executed by the processor, toggle display of the navigation pane off and on responsive to a user input.

10. The device of claim 1 wherein the screen has a width and a top and wherein, in page mode, in response to a user tapping within an area of a first text column having a first line, a width of the first text column is zoomed to the width of the screen, and the first text column is positioned with its first line at the top of the screen.

11. The device of claim 10 wherein the first text column includes a first segment of the PDF document, wherein a next icon appears at the bottom of the first text column, and wherein, in response to the user selecting the next icon, a second text column including a next segment of the PDF document is displayed on the screen.

12. The device of claim 1, wherein the viewer application software code portions, when executed by the processor, extract the text from the PDF document, including: (a) identifying content areas of the PDF document of a text type, (b) correlating each of the identified content areas with a content unit, and (c) identifying a correct reading order for the content areas of each content unit.

13. The device of claim 12, wherein analyzing the PDF document comprises analyzing font size or case of initial letters or word of a content area.

14. The device of claim 12, wherein analyzing the PDF document comprises detecting and deciphering continuation guidance within a content area.

15. The device of claim 12, wherein analyzing the PDF document comprises determining a content area to be not of a text type in response to determining that the content area contains ten words or fewer.

16. The device of claim 12, wherein analyzing the PDF document comprises determining a content area to be not of a text type in response to determining that it is identical to a text entry in a table of contents.

17. A non-transitory computer readable medium for use with a small screen device which includes a display screen, and for use further with a PDF document including a current page, the current page having an original layout which includes text, the medium having stored thereon:
viewer application software code portions which, when executed by a processor, perform displaying at least a portion of the PDF document on the display screen, in
a page mode, wherein the original layout of the current page of the PDF document is preserved; and
viewer application software code portions which, when executed by a processor, perform (i) obtaining a selection of a portion of the PDF document to display in a text mode, (ii) extracting the text of the selected portion of the PDF document from the PDF document and (iii) reformatting extracted text of the selected portion of the PDF document with word wrapping to fit a hand held device screen format in a text view.

18. The non-transitory computer readable medium of claim 17, further including viewer application software code portions which, when executed by the processor, toggle between displaying the at least a portion of the PDF document in page mode and displaying the selected portion of the PDF document in text mode responsive to a user input.

19. The non-transitory computer readable medium of claim 17, wherein the original layout includes multiple content areas.

20. The non-transitory computer readable medium of claim 19, wherein the multiple content areas include at least two types of content areas from the group consisting of titles, subtitles, captions, body text, and images.

21. The non-transitory computer readable medium of claim 17, wherein the non-transitory computer readable medium is a mobile phone or a tablet.

22. The non-transitory computer readable medium of claim 17, wherein, in page mode, the current page is displayed on the display screen in the original layout.

23. The non-transitory computer readable medium of claim 17, wherein the PDF document is a magazine article or newspaper article.

24. The non-transitory computer readable medium of claim 17, wherein the viewer application software code portions, when executed by the processor, extract the text from the PDF document, including: (a) identifying content areas of the PDF document of a text type, (b) correlating each of the identified content areas with a content unit, and (c) identifying a correct reading order for the content areas of each content unit.

25. The non-transitory computer readable medium of claim 24, wherein analyzing the PDF document comprises analyzing font size or case of initial letters or word of a content area.

26. The non-transitory computer readable medium of claim 24, wherein analyzing the PDF document comprises detecting and deciphering continuation guidance within a content area.

27. The non-transitory computer readable medium of claim 24, wherein analyzing the PDF document comprises determining a content area to be not of a text type in response to determining that the content area contains ten words or fewer.

28. The non-transitory computer readable medium of claim 24, wherein analyzing the PDF document comprises determining a content area to be not of a text type in response to determining that it is identical to a text entry in a table of contents.

29. A method of presenting a PDF file on a display screen of a hand held device, comprising a processor of the hand held device:

accessing a PDF document including a current page, the current page having an original layout which includes text, displaying on the display screen of the hand held device, at least a portion of the PDF document in a page mode, wherein the original layout of the current page of the PDF document is preserved; and obtaining a selection of a portion of the PDF document to display in a text mode, extracting the text of the selected portion of the PDF document from the PDF document, and reformatted extracted text of the selected portion of the PDF document with word wrapping to fit a hand held device screen format in a text view.

30. The method of claim 29, wherein the method further includes toggling between displaying the at least a portion of the PDF document in page mode and displaying the selected portion of the PDF document in text mode responsive to a user input.

31. The method of claim 29, wherein the original layout includes multiple content areas.

32. The method of claim 31, wherein the multiple content areas include at least two types of content areas from the group consisting of titles, subtitles, captions, body text, and images.

33. The method of claim 29, wherein the method is a mobile phone or a tablet.

34. The method of claim 29, wherein, in page mode, the current page is displayed on the display screen in the original layout.

35. The method of claim 32 wherein, in text mode, the body text is extracted from the PDF document and is reformatted to be continuous and complete in correct reading order.

36. The method of claim 35, wherein the PDF document is a magazine article or newspaper article.

37. The method of claim 29, wherein when the processor causes display of a full page of the PDF document in page view the smallest displayed text has a first font size, and wherein when the processor causes display of the extracted text from the PDF document reformatted in the text view, the smallest displayed text has a second font size which is larger than the first font size.

38. The method of claim 29, wherein the viewer application extracts the text from the PDF document, including: (a) identifying content areas of the PDF document of a text type, (b) correlating each of the identified content areas with a content unit, and (c) identifying a correct reading order for the content areas of each content unit.

* * * * *